United States Patent
Browder et al.

(10) Patent No.: US 12,547,433 B1
(45) Date of Patent: Feb. 10, 2026

(54) METHODS AND SYSTEMS FOR GENERATING A MODIFIED GRAPHICAL USER INTERFACE USING AN OPTIMIZATION PROTOCOL

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 19/212,206

(22) Filed: May 19, 2025

Related U.S. Application Data

(63) Continuation of application No. 18/957,773, filed on Nov. 24, 2024, now Pat. No. 12,333,318.

(51) Int. Cl.
  *G06F 9/451* (2018.01)

(52) U.S. Cl.
  CPC .................. *G06F 9/451* (2018.02)

(58) Field of Classification Search
  CPC .................. G06F 9/451; G06N 20/00
  See application file for complete search history.

(56) References Cited

U.S. PATENT DOCUMENTS

| | | | |
|---|---|---|---|
| 7,213,009 B2 | 5/2007 | Pestotnik et al. | |
| 7,756,723 B2 | 7/2010 | Rosow et al. | |
| 8,190,451 B2 | 5/2012 | Lloyd et al. | |
| 12,014,285 B2 | 6/2024 | Gharat et al. | |

(Continued)

FOREIGN PATENT DOCUMENTS

| | | |
|---|---|---|
| IN | 202441018480 A | 3/2024 |
| IN | 202441042769 A | 6/2024 |
| IN | 202441072725 A | 10/2024 |

OTHER PUBLICATIONS

Manuel Tello et al Machine learning based forecast for the prediction of inpatient bed demand BMC Med Inform Decis Mak. Mar. 2, 2022.

(Continued)

*Primary Examiner* — Andrey Belousov
(74) *Attorney, Agent, or Firm* — Caldwell Intellectual Property Law

(57) ABSTRACT

A system for generating a modified graphical user interface using an optimization protocol, wherein the system includes: a display device, at least a computing device, a memory; and a processor communicatively connected to the memory, wherein the memory contains instructions configuring the processor to: receive a plurality of inputs; display a plurality of input triggers; generate, using the at least a processor, an admission pathway as a function of the verified input trigger, wherein generating the admission pathway includes generating an admission pathway machine-learning model using admission pathway training data configured to correlate each input of the plurality of inputs to the admission pathway; optimize each input of the plurality of inputs as a function of the admission pathway machine-learning model; modify the graphical user interface as a function of the admission pathway and an optimized input of the plurality of inputs, and display a modified graphical user interface.

20 Claims, 8 Drawing Sheets

(56) References Cited

U.S. PATENT DOCUMENTS

| | | | | |
|---|---|---|---|---|
| 2015/0169835 A1* | 6/2015 | Hamdan | ............ | G06N 5/04 |
| | | | | 706/11 |
| 2015/0220699 A1* | 8/2015 | Ostrovsky | ............ | G06Q 10/10 |
| | | | | 705/2 |
| 2023/0215568 A1 | 7/2023 | Kumar et al. | | |
| 2024/0395369 A1 | 11/2024 | Mariappan et al. | | |
| 2024/0428941 A1 | 12/2024 | Tripuraneni | | |
| 2025/0185998 A1* | 6/2025 | Nimmich | ............ | G16H 40/63 |

OTHER PUBLICATIONS

Arash Nemati et al A forecasting approach for hospital bed capacity planning using machine learning and deep learning with application to public hospitals "Healthcare Analyticsvol. 4, Dec. 2023, 100245".
Hyeram Seo et al Forecasting Hospital Room and Ward Occupancy Using Static and Dynamic Information Concurrently: Retrospective Single-Center Cohort Study "JMIR Med InformPublished on Mar. 21, 2024 in vol. 12 (2024)".

* cited by examiner

METHODS AND SYSTEMS FOR GENERATING A MODIFIED GRAPHICAL USER INTERFACE USING AN OPTIMIZATION PROTOCOL

CROSS-REFERENCE TO RELATED APPLICATIONS

This application is a continuation of Non-provisional application Ser. No. 18/957,773, filed on Nov. 24, 2024, and entitled "METHODS AND SYSTEMS FOR GENERATING A MODIFIED GRAPHICAL USER INTERFACE USING AN OPTIMIZATION PROTOCOL," the entirety of which is incorporated herein by reference.

FIELD OF THE INVENTION

The present invention generally relates to the field of user interfaces. In particular, the present invention is directed to generating a modified graphical user interface using an optimization protocol.

BACKGROUND

Modern graphical user interfaces (GUIs) used in interactive systems often struggle to dynamically identify the most influential inputs and their corresponding effects on machine learning and computing systems as a whole. Current systems typically treat inputs uniformly, failing to provide insight into which specific factors drive the outcomes of machine learning algorithms. This lack of distinction can limit the ability of users to understand or optimize decision-making processes, particularly in complex applications such as healthcare, finance, or predictive analytics, where multiple variables are at play.

SUMMARY OF THE DISCLOSURE

In an aspect, a system for generating a modified graphical user interface using an optimization protocol is described. The system includes a display device, wherein the display device displays a graphical user interface and at least a computing device, wherein the computing device includes a memory and at least a processor communicatively connected to the memory. The memory contains instructions configuring the at least a processor to receive a plurality of inputs using the graphical user interface operating on the display device, wherein the plurality of inputs includes specific-node data, display, using the graphical user interface, a plurality of input triggers wherein an input trigger of the plurality of input triggers corresponds to at least a visual element, generate an admission pathway as a function of the input trigger of the plurality of input triggers, determine, using an optimization protocol, an optimization score using each input of the plurality of inputs as a function of the admission pathway generate a modified graphical user interface as a function of the admission pathway and an optimized input of the plurality of inputs and display at least the admission pathway through the modified graphical user interface.

In another aspect, a method for generating a modified graphical user interface using an optimization protocol is described. The method includes receiving, by at least a processor, a plurality of inputs using a graphical user interface operating on a display device, wherein the plurality of inputs includes specific-node data, displaying, using the graphical user interface, a plurality of input triggers wherein an input trigger of the plurality of input triggers corresponds to at least a visual element, generating, using the at least a processor, an admission pathway as a function of the input trigger of the plurality of input triggers, determining, by at least the processor, an optimization score using each input of the plurality of inputs as a function of the admission pathway, generating, using the at least a processor, a modified graphical user interface as a function of the admission pathway and an optimized input of the plurality of inputs and displaying, by the at least a processor, at least the admission pathway through the modified graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a modified graphical user interface using an optimization protocol. In an embodiment, a system for generating a modified graphical user interface using an optimization protocol, wherein the system includes: a display device, wherein the display device displays a graphical user interface; at least a computing device, wherein the computing device includes: a memory; and at least a processor communicatively connected to the memory, wherein the memory contains instructions configure the at least a processor: receive a plurality of inputs using the graphical user interface operating on the display device; display, using the graphical user interface, a plurality of input triggers wherein a input trigger of the plurality of input triggers corresponds to at least a visual element; generate, using the at least a processor, an admission pathway as a function of the verified input trigger, wherein generating the admission pathway includes generating an admission pathway machine-learning model using admission pathway training data configured to correlate each input of the plurality of inputs to the admission pathway; optimize, using an optimization protocol, each input of the plurality of inputs as a function of the admission pathway machine-learning model; modify, using the at least a processor, the graphical user interface as a function of the admission pathway and an optimized input of the plurality of inputs, and display, using a downstream device, a modified graphical user interface. Exemplary embodiments illustrating aspects of the present disclosure are described below in the context of several specific examples.

Figure 1:
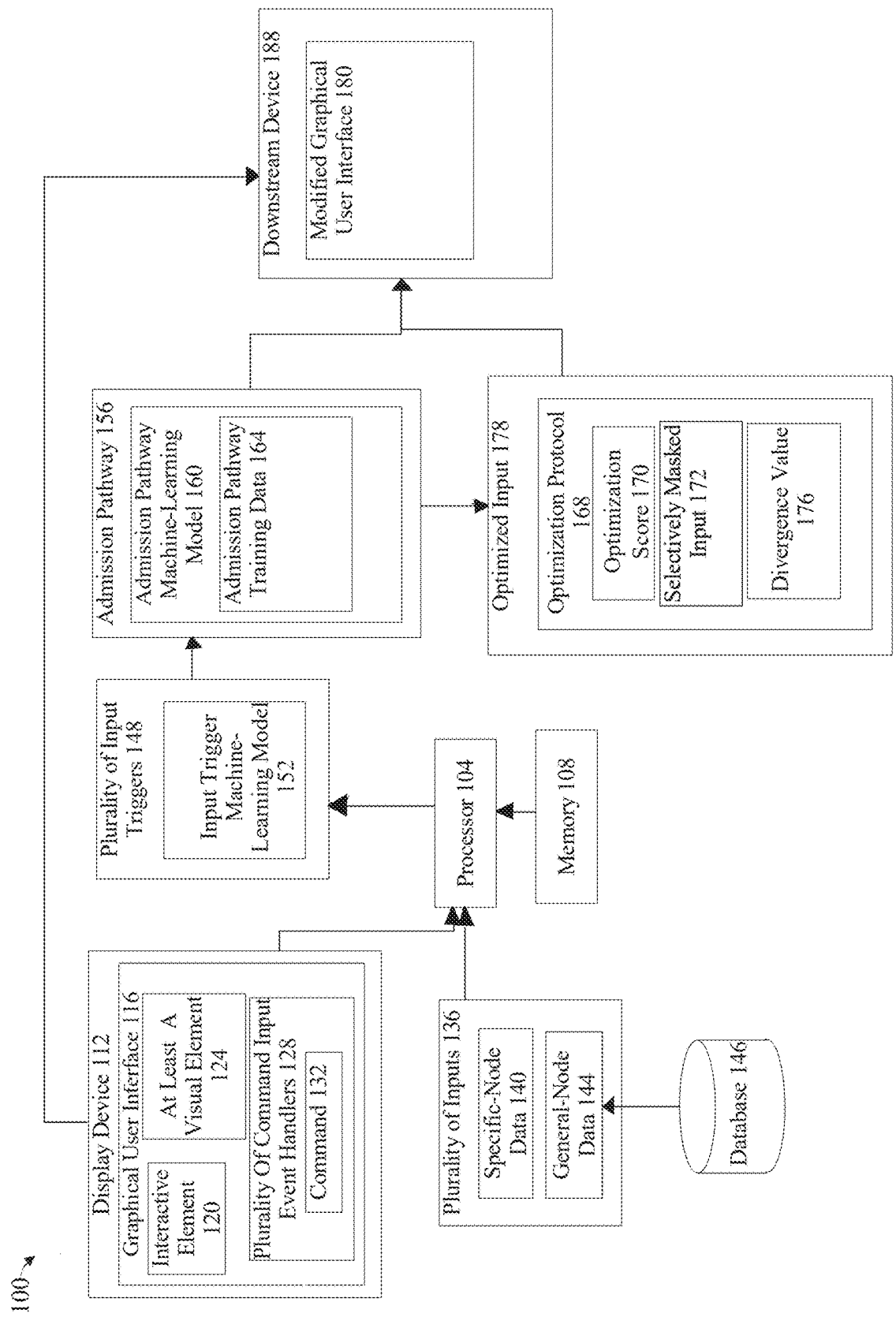
FIG. 1 is a flow diagram illustrating a system for generating a modified graphical user interface using an optimization protocol.

Referring now to FIG. 1, an exemplary embodiment of a system for generating a modified graphical user interface using an optimization protocol is illustrated. System 100 may include a processor 104 communicatively connected to a memory 108. As used in this disclosure, "communicatively connected" means connected by way of a connection, attachment, or linkage between two or more relata which allows for reception and/or transmittance of information therebetween. In a non-limiting embodiment, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, In a non-limiting embodiment and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. In a non-limiting embodiment, and without limitation, via a bus or other facility for intercommunication between elements of a computing device. Communicative connecting may also include indirect connections via, In a non-limiting embodiment and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 104. In one or more embodiments, data is transferred from secondary to primary memory wherein processor 104 may access the information from primary memory.

Still referring to FIG. 1, system 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. In a non-limiting embodiment, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the system computing device. In one or more embodiments, computing device may transmit processes to server wherein computing device may conserve power or energy.

Further referring to FIG. 1, system 100 may include any "computing device" as described in this disclosure, including without limitation a microcontroller, microprocessor, digital signal processor (DSP) and/or system on a chip (SoC) as described in this disclosure. System 100 may include, be included in, and/or communicate with a mobile device such as a mobile telephone or smartphone. System 100 may include a single computing device operating independently, or may include two or more computing devices operating in concert, in parallel, sequentially or the like; two or more computing devices may be included together in a single computing device or in two or more computing devices. System 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, In a non-limiting embodiment, a computing device or cluster of computing devices in a first location and a second computing device or cluster of computing devices in a second location. System 100 may include one or more computing devices dedicated to data storage, security, distribution of traffic for load balancing, and the like. System 100 may distribute one or more computing tasks as described below across a plurality of computing devices of computing device, which may operate in parallel, in series, redundantly, or in any other manner used for distribution of tasks or memory between computing devices. System 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a display device 112 wherein display device 112 displays a graphical user interface 116. A "graphical user interface (GUI)," as used herein, is a graphical form of user interface that allows users to interact with electronic devices. In some embodiments, GUI 116 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages, and the like may be represented using a small picture in a graphical user interface. In a non-limiting embodiment, links to decentralized platforms as described in this disclosure may be incorporated using icons. Using an icon may be a fast way to open documents, run programs etc. because clicking on them yields instant access.

As used in this disclosure, an "interactive element" is a component within a system, interface, or device that allows a user to engage with and influence the system's behavior or output through actions. In a non-limiting example, the actions may include clicking, touching, or inputting data. Without limitation, the interactive element 120 may respond dynamically to an input, enabling real-time feedback or control over system functions. In a non-limiting embodiment, without limitation the interactive element 120 may include buttons, sliders, input fields, or menus in software interfaces, as well as physical controls like switches or touchscreens in hardware devices. Each interactive element of a plurality of interactive elements may comprise an event handler configured to detect an interaction and generate response data as a function of the interaction.

As used in this disclosure, a "visual element" is a component or feature within a system, display, or interface that conveys information through visual means. In a non-limiting example, the visual element 124 may include text, images, icons, shapes, colors, and/or other graphical components designed to be perceived by the user. In a non-limiting example, the visual element 124 may aid in communication, navigation, and/or interaction with the system. Without limitation, the visual element 124 may be used to enhance user experience, guide behavior, and/or represent data visually in an intuitive or informative way. A visual element 124 may include any data transmitted to display device, client device, and/or graphical user interface 116. In some embodiments, visual element 124 may be interacted with. In a non-limiting embodiment, visual element 124 may include an interface, such as a button or menu. In some embodiments, visual element 124 may be interacted with using a user device such as a smartphone, tablet, smartwatch, or computer.

Still referring to FIG. 1, processor 104 displays, using the graphical user interface 116 a plurality of command input event handlers 128 wherein a command 132 in the plurality of command input event handlers 128 corresponds to the at least a visual element 124. As used in this disclosure, a "command input event handler" is a is a structured list of tasks, instructions, and/or operations that are organized in a specific sequence. In a non-limiting example, the plurality of command input event handlers 128 may include at least a command 132. As used in this disclosure, a "command" is an instruction or directive given to a person, system, device, and/or process to perform a specific action or task. Without limitation, the command 132 may initiate an operation, alter system behavior, or trigger a response, and may be issued manually by a user or automatically by a program or system. In a non-limiting example, the command 132 may control hardware functions, execute software routines, or interact with external systems, and may be part of a sequence within the plurality of command input event handlers 128. In a non-limiting example, the command 132 may be awaiting execution or confirmation from a user. In a non-limiting example, the plurality of command input event handlers 128 may function as a checklist where each command 132 or task may be processed, executed, or marked as completed by the user or system.

Still referring to FIG. 1, at least a processor 104 may be configured to receive a plurality of inputs 136 using the graphical user interface 116 operating on the display device 112. As used herein, a "plurality of inputs" refers to distinct types of data relating to a node. As used herein, a "node" refers to a central entity representing a patient and all associated data within a healthcare system or network. Each node serves as a hub within the system, where all patient-related data is aggregated and stored, allowing for efficient retrieval and processing by the software. The node may interact with other nodes or systems to exchange data, enabling comprehensive analysis and decision-making processes, such as generating admission outcomes or medical reports. The plurality of inputs 136 may include essential data such as insurance information, patient medical history, diagnosis details, and other relevant factors. The software may prompt a user to input specific aspects of the patient's data, which are critical for the system's analysis, through a chatbot displayed within the graphical user interface 116. In some embodiments, the plurality of inputs may involve both manual data entry and automatic retrieval of node data. This diverse set of inputs is processed by an underlying model, such as a machine learning or artificial intelligence model, to generate an admission suggestion. These suggestions, based on the plurality of inputs, are then displayed to the user through a graphical user interface, where the user can make a final determination by accepting, rejecting, or modifying the system's recommendation. This multi-input approach ensures that admission decisions are informed, efficient, and optimized for patient care and hospital resource management. In an embodiment, the plurality of inputs 136 comprises specific-node data 140. Specific-node data refers to a single collection of all individualized and uniquely identifiable data points associated with a single patient. Each specific-node serves as a singular repository for the patient's data, ensuring that all relevant information is connected to that specific patient and is easily accessible by the healthcare system. The integrity of the specific-node data ensures that all information is correctly associated with the individual patient, facilitating accurate decision-making, reporting, and seamless communication between different parts of the healthcare system. In an embodiment, the at least a processor 104 is configured to receive general-node data 144 from a database 146, wherein the at least a processor is further configured to parse the database for the general node data 144 comprising at least a characteristic of the specific-node data 140. As used herein, "general-node data" refers to data that is not specific to a single person but instead encompasses broader, more generalized information within a system. For example, general-node data may include data that is not specific to a patient, but is broader and more generalized information regarding a healthcare system. This type of data may include aggregated or anonymized patient statistics, trends, or system-wide metrics that are used for analysis, reporting, and operational decision-making. Examples of general-node data include overall hospital bed availability, admission rates, common diagnoses across multiple patients, average treatment durations, or general patient outcome trends. By parsing both specific-node data and general-node data, the processor may identify relevant relationships, patterns, or correlations between a single patient's data and broader population-level data. In another non-limiting embodiment, parsing the database for general node data 144 comprises using a classifier to correlate elements of specific-node data to elements of general-node data. The classifier may use machine learning algorithms or other statistical methods to identify connections between the characteristics of an individual patient and broader trends observed across multiple patients. For instance, if a patient presents with a particular diagnosis or symptom profile (specific-node data), the classifier may correlate that with general-node data reflecting the typical treatment outcomes or hospitalization rates for patients with similar conditions. The classifier may be trained using historical correlations, example correlations, feedback on correlations, and the like.

Still referring to FIG. 1, system 100 may be configured to display, using the graphical user interface 116, a plurality of input triggers 148. In an embodiment, an input trigger of the plurality of input triggers may correspond to at least one visual element such as buttons, dropdown menus, checkboxes, or text fields presented on the GUI. These visual elements enable the user to input, select, or modify specific data, which is crucial to determining a patient's admission outcome. As used herein, the "plurality of input triggers" refers to any data necessary for determining an admission outcome. In an embodiment, plurality of input triggers may include but is not limited to insurance data, illness data, diagnosis data, and other relevant patient information. The plurality of input triggers may include baseline data associated with the plurality of inputs. Baseline data refers to foundational or reference data points that are established for each input trigger and are used to validate, guide, or contextualize the user's inputs. These baseline data points may represent predefined standards, historical averages, or typical values that serve as benchmarks for the plurality of inputs 136 entered into system 100. In a non-limiting embodiment, in a healthcare system configured to determine patient admission outcomes, each input trigger might correspond to specific types of patient-related information, such as insurance details, diagnosis codes, or symptoms. The baseline data for these inputs may include industry-standard values or hospital-specific thresholds that are used to ensure that the data entered falls within expected ranges. For insurance data, baseline data might consist of coverage limits or known policies for various providers. For diagnosis or symptom-related inputs, baseline data could include typical diagnosis codes or illness classifications based on widely accepted medical guidelines or patterns observed in previous cases. In an embodiment, displaying the plurality of input triggers 148 may include comparing general-node data 144 to specific-node data 140, wherein the comparison may highlight discrepancies between an individuals healthcare needs and a group of individuals with similar demographics healthcare needs. In an embodiment, general-node data 144 represents aggregated healthcare data or trends within a broader demographic group (e.g., individuals of a similar age, medical history, or geographic location), while specific-node data 140 captures individualized healthcare needs, conditions, or preferences unique to a specific patient. By comparing these two datasets, the system can identify discrepancies or deviations between an individual's healthcare profile and the typical profile of a cohort with similar demographic attributes. This comparison may highlight specific areas where an individual may require additional or specialized care, uncovering gaps or unmet needs not typically seen in the broader group. For example, if general-node data indicates that patients of a certain age and health background generally follow a particular treatment protocol, but an individual's specific-node data reveals atypical symptoms or conditions, the system can trigger alerts to suggest alternative or supplementary interventions. In a non-limiting embodiment, one input trigger 148 may prompt the user to select or input insurance coverage information, such as the patient's provider, policy details, or coverage limits. Another input trigger 148 may correspond to illness-related data, allowing the user to input information about the patient's presenting symptoms or conditions. Additional input triggers may relate to diagnosis data, enabling the user to input a patient's current or prior diagnoses, severity of illness, or any comorbid conditions.

Continuing reference to FIG. 1, The plurality of input triggers may be displayed as a function of general-node data, specific-node data, plurality of inputs, and the like. In a non-limiting embodiment, the at least a processor 104 may be configured to verify the input trigger 148, wherein verifying the input trigger may include generating an input trigger machine learning model 152 trained using input trigger training data. Verification using the machine-learning model may occur by identifying discrepancies between specific-node data and expected versus actual general-node data correlations. In a non-limiting embodiment, if the expected output differs greatly from the actual output, system 100 may generate a notification required that a user verifies the plurality of inputs. If the expected output and actual output align, then the specific-node data input may be considered verified. In an embodiment, the input trigger training data may be configured to correlate general-node data inputs to example input trigger outputs. In an embodiment, the input trigger training data may be configured to correlate general-node data inputs to example input trigger outputs. Specifically, this training data may consist of historical records or datasets that encompass a wide range of patient-related information, including insurance data, diagnosis codes, illness statistics, and other system-wide metrics aggregated across multiple patients. In an embodiment, the input trigger machine learning model 152 may evolve over time as more data is introduced to the system, improving its ability to correlate specific-node data 140 and general-node data 144. In a non-limiting embodiment, as more cases are processed, the model may become better at identifying specific admission patterns tied to certain diagnoses, insurance coverage types, or referral sources. In some embodiments, the input trigger machine learning model may also provide predictive insights based on the correlation between the general-node data and the input trigger outputs. In a non-limiting embodiment, if the input trigger 148 involves entering patient illness data, the system might predict the likely duration of admission, or the probability of admission approval based on patterns observed in the general-node data. The model could suggest optimal resource allocation or trigger a recommendation for alternative care paths based on the data correlations.

Continuing reference to FIG. 1, the at least a processor 104 may be configured to generate an admission pathway 156 as a function of the input trigger of the plurality of input triggers. As used herein, an "admission pathway" refers to a series of steps, decisions, or recommendations generated by the system to guide the patient through the process of admission based on the plurality of inputs provided by the input triggers. In an embodiment, each input trigger of the plurality of input triggers 148 corresponds to critical specific-node data 140 or general-node data 144, such as insurance information, diagnosis codes, symptoms, or medical history. In a non-limiting embodiment, when the user inputs a patient's diagnosis data (specific-node data 140) through an input trigger, the processor 104 may analyze this data against baseline medical information, resource availability, and hospital capacity to determine the best course of action. If the diagnosis indicates a high-risk condition, the admission pathway 156 generated by the processor might prioritize placing the patient in a specialized care unit with additional monitoring, while also checking resource availability, such as beds and staff, in real time. The admission pathway may also be dynamically updated as more input triggers 148 are provided or as patient data changes during the course of admission. For instance, if new symptoms arise or the patient's condition worsens, the processor 104 may modify the admission pathway 156 to include a transfer to a higher level of care or to prioritize urgent treatment based on the new input data. The system ensures that the pathway is continuously optimized to reflect the patient's evolving needs and the hospital's resource availability. In some embodiments, the admission pathway 156 may also incorporate predictive analytics. Using data patterns derived from the general-node data, the processor 104 may predict the patient's likely outcomes or resource needs, adjusting the admission pathway 156 accordingly. For instance, based on the input trigger 148 data related to the patient's illness or treatment history, the system may predict the expected duration of stay or the likelihood of complications, guiding the healthcare provider in making informed decisions about resource allocation and care planning. The admission pathway 156, once generated, may be displayed to the user via GUI 116, presenting a clear, step-by-step plan that includes recommendations, possible contingencies, and resource management considerations. The user may have the ability to interact with the pathway, modifying steps or inputting additional data as needed to further refine the admission process, through interactive elements 120.

Still referring to FIG. 1, in an embodiment, generating the admission pathway 156 may include generating an admission pathway machine-learning model 160 using admission pathway training data 164 configured to correlate each input of the plurality of inputs to an admission pathway output. As used herein, admission pathway machine-learning model 160 is used to generate admission pathways based on specific-node data 140, general-node data 144, plurality of inputs 136, and/or the like. The admission pathway training data 164 may be configured to train admission pathway machine-learning model 160 to accurately generate and refine admission pathways 156. The admission pathway training data may include node data correlated to an admission pathway output. The admission pathway training data 164 may include iterative rounds of input and output data to ensure that the model becomes progressively more accurate and reliable over time. Each set of admission pathway training data 164 may involve the plurality of inputs 136 such as patient demographics, insurance details, diagnosis codes, symptom descriptions, historical admission outcomes, and the like. For every set of inputs, the system 100 may generate corresponding admission outputs, which may include decisions such as admission approval, department assignment, treatment suggestions, resource allocations, and the like. System 100 may then be configured to compare the generated outputs with expected or desired outcomes, possibly based on established clinical guidelines, historical benchmarks, expert recommendations, and the like. Throughout the training process, feedback may be collected on the accuracy of the generated admission pathways in comparison to the expected or desired output values. In an embodiment, if the generated admission pathway deviates from an expected output, the system may identify the discrepancies and use this information to adjust its underlying algorithms and improve future pathway generation. For instance, if an input related to a high-risk diagnosis fails to trigger an appropriate urgent care recommendation, the feedback would highlight this error, prompting the model to modify its decision-making process for similar cases in subsequent rounds. Each round of input-output correlation allows the system to fine-tune its predictive capabilities by learning from past inaccuracies and refining its internal parameters to align more closely with desired outcomes. In some embodiments, the training data also includes real-time feedback from users or healthcare providers interacting with the generated admission pathways. In a non-limiting embodiment, if a healthcare provider modifies the suggested pathway due to unforeseen circumstances (e.g., the patient's condition changes, or hospital resources become limited), the system records this adjustment as feedback.

Still referring to FIG. 1, at least a processor 104 may be configured to determine an optimization score 170 using each input of the plurality of inputs as a function of the admission pathway machine-learning model using an optimization protocol 168. Optimization protocol 168 may involve ranking and prioritizing the inputs based on their relevance and effectiveness in determining the most accurate and appropriate admission pathway. As used herein an "optimization score" represents a quantitative assessment of each input's relevance and effectiveness in determining the most accurate admission pathway within the optimization protocol 168. Optimization score 170 is derived by evaluating how each input, such as patient demographics, insurance details, diagnosis codes, symptoms, and treatment history, contributes to the prediction and generation of the admission pathway. The optimization protocol 168 may rank inputs by analyzing their historical impact on accurate admission decisions, with higher scores assigned to inputs that consistently enhance decision accuracy and relevance. The optimization protocol 168 may analyze each input of the plurality of inputs 136, such as patient demographic data, insurance details, diagnosis codes, symptom information, and treatment history, within the context of the admission pathway machine-learning model 160, to identify an optimized input 178. The processor 104 may apply the optimization protocol 168 to evaluate how effectively each input contributes to the prediction and generation of the admission pathway 156. The optimization protocol 168 may rank the inputs by assessing their impact on the final admission decision, ensuring that the most relevant and high-value inputs are prioritized in the admission pathway generation. The ranking process may begin by evaluating the historical performance of each type of input within the admission pathway machine-learning model's training data 164. Inputs that have consistently contributed to accurate admission decisions—such as specific diagnoses or critical insurance factors—may be ranked higher in the optimization process. Conversely, inputs that have a lower predictive value or are less relevant to the admission pathway in a given context could be ranked lower. Optimization protocol 168 may include an optimization machine learning model. The optimization machine-learning model may analyze several factors to determine the effectiveness of each input, including patterns in previous admissions, patient outcomes, and resource allocation efficiency. Optimization machine learning model may be trained using optimization training data correlating inputs to prioritized rankings using example prioritization correlations, historical prioritization values, and the like. This training data may also include past inputs and outputs from the admission pathway ML model to train the optimization machine learning model. Once each input of the plurality of inputs 136 has been ranked, the processor 104 may select and apply the most optimized input for calculating the admission pathway 156. This means that the inputs ranked highest—based on their demonstrated effectiveness in past cases—could carry more weight in the decision-making process. In a non-limiting embodiment, if a patient's diagnosis data has been found to be a strong predictor of the necessary care pathway, that input could be prioritized and heavily influence the generated admission pathway. Similarly, if insurance data plays a crucial role in determining the financial feasibility of admission, it may also be ranked as a top input and factored significantly into the pathway calculation. The optimization protocol 168 may ensure that the system does not treat all inputs equally but instead focuses on those that provide the most valuable information for generating a precise and efficient admission pathway 156. This ranking and prioritization could help streamline the decision-making process, reducing the risk of less relevant or extraneous inputs affecting the accuracy of the model's output. For instance, if the model has determined that insurance coverage limits have historically had little effect on predicting the admission outcome for certain types of cases (e.g., emergency care situations), those inputs may be ranked lower. On the other hand, inputs such as a patient's critical diagnosis or current bed availability in a specialized care unit may be ranked much higher, as they could directly influence the hospital's ability to provide immediate and appropriate care. Once the most optimized inputs have been identified and ranked, they may be applied in the calculation of the admission pathway 156, allowing the admission pathway machine-learning model 160 to focus on the most pertinent data and reduce the impact of less significant inputs. This could result in a more refined and efficient admission pathway that better aligns with the specific needs of the patient and the operational capabilities of the healthcare facility. In some embodiments, the optimization protocol 168 may be dynamic, meaning that it could continually update the rankings of inputs based on new data or feedback from prior admissions. In a non-limiting embodiment, as the system processes more admissions, it may learn that certain inputs—such as referral sources or previous treatment history—are becoming increasingly important for specific types of patients, leading to their higher ranking in future optimizations.

Continuing to refer to FIG. 1, optimizing each input of the plurality of inputs 136 may include selectively masking the inputs of the plurality of inputs and calculating a divergence value 176 of the admission pathway 156 as a function of the selectively masked input 172 In an embodiment, selectively masking inputs refers to temporarily omitting or deactivating certain inputs from the plurality of inputs 136 during the optimization process to evaluate their individual impact on the admission pathway calculation. By selectively masking one or more inputs, the system can isolate the effect of specific data points, allowing the processor to determine which inputs significantly influence the generated admission pathway 156 and which inputs may be less relevant or redundant. Once an input is masked, the system generates an admission pathway 156 without incorporating that particular input into the calculation. The divergence value 176 is then calculated to measure the difference between the admission pathway generated with the masked input and the pathway generated with all inputs active. This divergence value 176 may represent a quantitative or qualitative assessment of how much the omission of the input alters the final admission pathway. In a non-limiting embodiment, if a diagnosis input is selectively masked and the resulting pathway differs significantly from the expected outcome, this may indicate that the diagnosis input plays a critical role in determining the admission pathway, resulting in a high divergence value. On the other hand, if the masked input leads to minimal changes in the pathway, the divergence value would be low, suggesting that the input has less influence on the final admission decision. The system 100 may repeat this process for each input of the plurality of inputs, systematically masking and unmasking them to calculate divergence values for each input. These divergence values may provide insights into the relative importance of each input, allowing the processor 104 to optimize the overall calculation by prioritizing the optimized input 178 that results in the least divergence when omitted. In some embodiments, the divergence values 176 calculated through selective masking could be used to further refine the admission pathway machine-learning model 160. In a non-limiting embodiment, inputs that consistently show high divergence when masked may be assigned greater weight in the model, while inputs with low divergence values may be given less emphasis or even excluded from future admission pathway calculations. This feedback loop may enable the admission pathway machine learning model 160 to become more efficient and accurate over time by focusing on the inputs that have the most meaningful impact on admission pathways 156.

Still referring to FIG. 1, at least a processor may be configured to generate a modified graphical user interface 180 as a function of the admission pathway 156 and an optimized input 178. In an embodiment, modified graphical user interface 180 is designed to visually present the generated admission pathway 156 alongside the optimized input 178 and additional high-ranking inputs, to provide the user with a clear and detailed overview of how the admission pathway was determined. The modified graphical user interface 180 may be designed to display the admission pathway in an interactive format, allowing healthcare providers to easily review the system's recommended steps for admitting the patient. This admission pathway 156 may include key decisions such as whether the patient should be admitted, what department or care unit is appropriate, and any associated resources or treatments required. The admission pathway 156 may be displayed as a visual flowchart, a list, or other intuitive formats. In addition to displaying the admission pathway 156, the modified GUI 180 may also highlight the optimized input 178, which may represent the input of the plurality of inputs 136 determined to be the most critical for generating the admission pathway 156. This input could be displayed prominently within the modified GUI 180. In a non-limiting embodiment, if the optimized input is the patient's diagnosis data, the modified GUI 180 may include an explanation indicating that the diagnosis strongly correlates with the recommended care pathway based on historical data or known medical guidelines. Furthermore, the modified GUI could be configured to display other highly ranked inputs in order of their importance in the admission decision. Each of these inputs may be accompanied by a brief rationale or justification explaining why the input was ranked highly. In a non-limiting embodiment, insurance data might be ranked second because it plays a significant role in determining the financial feasibility of the admission, while referral sources might be ranked third due to their strong correlation with previous patient outcomes.

Continuing reference to FIG. 1, at least a processor 104 may be configured to display, using a downstream device 188, the modified GUI 180. As used in this disclosure, "downstream device" is a device that accesses and interacts with system 100. For instance, and without limitation, downstream device 188 may include a remote device and/or system 100. In a non-limiting embodiment, downstream device 188 may be consistent with a computing device as described in the entirety of this disclosure. In a non-limiting embodiment, downstream device 188 may include a display that showcases the interactive element 120, which is configured to receive system feedback and trigger dynamic updates to the graphical user interface as a function of that feedback. The interactive element 120 could include user-activated components such as dropdown menus, buttons, sliders, or other interface tools that allow users to engage with and modify the admission pathway or the ranked inputs. In a non-limiting embodiment, an interactive dropdown menu could allow the user to select different filters or modify the weight assigned to certain inputs—such as adjusting the priority of insurance data versus medical diagnosis—based on real-time information or changing hospital needs. When the user interacts with these interactive elements, the system 100, through processor 104, may analyze the system feedback provided through the user inputs and make immediate updates to the modified GUI 180. For instance, if a healthcare provider uses the dropdown menu to lower the weight or ranking of a specific input (such as insurance data), the system 100 could recalculate the admission pathway 156, accordingly, dynamically adjusting the decision-making process in real time. This update may be immediately reflected on the modified GUI 180, showing the user how the pathway has changed based on their input and feedback. The modified GUI 180 may also display the reasoning behind the ranking of each input, which could be presented in tooltips, expandable sections, or real-time data visualizations. In a non-limiting embodiment, if a diagnosis input is ranked as the most important, the GUI could display the underlying rationale, such as data trends from previous admissions that show strong correlations between the specific diagnosis and the optimal care pathway. The interactive elements of the GUI could further allow users to explore these justifications in greater depth, offering transparency into the system's decision-making process. In a non-limiting example, the modified GUI 180 may present a series of buttons that, when clicked, prompt system 100 to perform additional analyses or provide more detailed insights. For instance, a user may click a button to compare the current admission pathway with alternate pathways, or to view the impact of different inputs on the overall recommendation. In a non-limiting embodiment, the system 100 may include a real-time feedback loop, where the user can provide feedback on the relevance or accuracy of the ranked inputs and the generated pathway, and the system would adjust dynamically in response. This feedback loop enhances the adaptability of the system, allowing it to refine and improve its decision-making processes based on actual user interactions. In another embodiment, the modified GUI 180 displayed on the downstream device 188 may allow users to request alternative admission pathways or simulate different outcomes based on hypothetical input changes. In a non-limiting embodiment, if the healthcare provider wants to explore how adjusting the patient's treatment history or diagnosis might alter the admission recommendation, the GUI could enable them to make those changes interactively, and the system would dynamically generate an updated pathway.

Figure 2A:
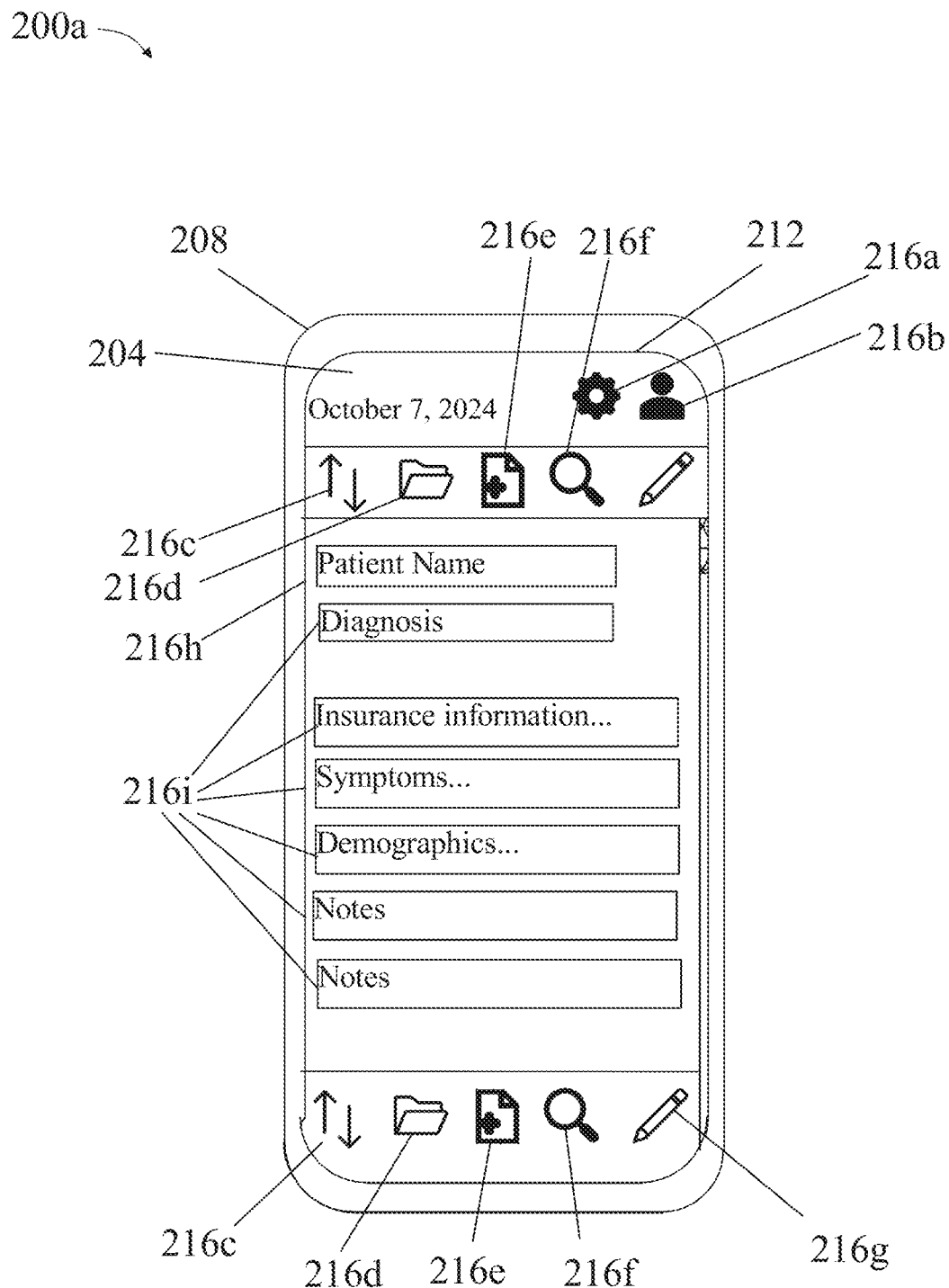
FIG. 2A is an exemplary illustration of a graphical user interface.

Referring now to FIG. 2A, an exemplary illustration 200a of a graphical user interface. In an embodiment, the graphical user interface 204 may be displayed using a downstream device 208. In an embodiment, the graphical user interface 204 may include at least a visual element 212. In an embodiment, the visual element 212 may include an interactive element 216a-m. In an embodiment the interactive element 216a-m may allow a user to engage directly with the graphical user interface 204 through a variety of actions.

In an embodiment, the interactive element 216a-m may include a settings gear 216a, a profile icon 216b, a sorting icon 216c, a folder 216d, a new task icon 216e, a find icon 216f, an edit icon 216g, a check box icon 216h, a scroll bar 216i, text description 216j, and the like.

In an embodiment, the interactive element 216a-m may include a settings gear 216a. In an embodiment, the settings gear 216a may enable users to access the system or application settings where they may modify preferences and configurations. Without limitation, by clicking on the settings gear 216a, users may adjust features like notifications, display options, account details, and the like. In an embodiment, the settings gear 216a may represent control over personalizing the environment within the application. In an embodiment, the settings gear 216a may ensure that users can customize their experience to meet their specific needs.

In an embodiment, the interactive element 216a-m may include a profile icon 216b, which may allow users to access their personal profile settings. In an embodiment, the profile icon 216b may link to a page where users may view and edit their personal information, such as their name, contact details, or profile picture. In an embodiment, the profile icon 216b may make it simple for users to manage their account and view related data quickly. In an embodiment, the profile icon 216b may be placed in a convenient location, allowing easy access to account settings. In an embodiment, the profile icon 216b may help users maintain control over their profile, ensuring that their information stays up-to-date.

In an embodiment, the interactive element 216a-m may include a sorting icon 216c, which may allow users to organize data based on specific criteria. In an embodiment, the sorting icon 216c may be useful when dealing with large datasets or lists that need to be filtered or reordered. Without limitation, by clicking the sorting icon 216c, users may arrange items by various attributes such as date, name, priority, and the like. In an embodiment, the sorting icon 216c may simplify the process of locating specific information, making the interface more efficient to use. In an embodiment, the sorting icon 216c may ensure that users can easily customize how they view and interact with the content.

In an embodiment, the interactive element 216a-m may include a folder icon 216d, which may represent access to a file or document management system. Without limitation, by clicking on the folder icon 216d it may open a directory or list of stored files, allowing users to organize their content within the application. In an embodiment, the folder icon 216d may be essential for managing documents, media, or other file types efficiently. In an embodiment, the folder icon 216d may be associated with file storage and navigation, making it a familiar and intuitive tool for users. In an embodiment, the folder icon 216d may aid in keeping information organized and accessible within the system.

In an embodiment, the interactive element 216a-m may include a new task icon 216e, which may allow users to create or add a new item to their task list or project. In an embodiment, the new task icon 216e may provide a quick way for users to input new assignments or goals, streamlining task management. In an embodiment, the new task icon 216e once clicked, may open a form or prompt where users may specify details about the new task. In an embodiment, the new task icon 216e may help users stay organized by adding tasks efficiently as they arise. In an embodiment, the new task icon 216e may be a valuable tool for productivity, helping users keep track of their to-do lists.

In an embodiment, the interactive element 216a-m may include a find icon 216f, which may function as a search tool for locating specific information within the application. In an embodiment, the find icon 216f may allow users to quickly search through data, files, or content to pinpoint exactly what they need. In an embodiment, the find icon 216f may be especially useful in applications that manage large volumes of information or files. In an embodiment, the find icon 216f may enhance efficiency by reducing the time spent manually browsing through content. Continuing, by providing a fast search function, users may access information more quickly and effectively.

In an embodiment, the interactive element 216a-m may include an edit icon 216g, which may enable users to modify or update existing content within the application. Continuing, by clicking on the edit icon 216g, it may bring users to an editable version of the item, such as a text document, task, or file. In an embodiment, the edit icon 216g may allow users to make corrections or updates as needed, maintaining the accuracy of the information. In an embodiment, the edit icon 216g may ensure that content remains current and can be easily adjusted as situations or data change. In an embodiment, the edit icon 216g may be a crucial tool for users who frequently update or revise their work.

Continuing reference to FIG. 2A, interactive element 216a-mh may include a specific-node identifying box, representing a text box with identifying information related to the specific-node data. This prompt box could serve as a user input field within the graphical user interface, guiding users to enter identifying information of a specific-node. When the user clicks or taps on the prompt box, the placeholder text may disappear, allowing the user to type in identifying information of the specific-node. This interactive element may also be configured to support real-time feedback, such as showing autocomplete suggestions or validating user input as they type, further enhancing user engagement and ensuring the system responds effectively to the query entered.

Continuing reference to FIG. 2A, interactive element 216a-m may include various user-entry boxes where a user may enter the plurality of inputs. These user-entry boxes could function as a critical component of the graphical user interface, enabling users to interact directly with the system by entering specific queries, instructions, or parameters. The user-entry box may display a placeholder, such as "Diagnosis . . . " to guide the user on what type of input is expected. When a user engages with the user-entry box, such as by clicking or tapping on it, the system may allow them to type their desired input, which could range from natural language queries to specific operational commands. The box could be configured to handle a variety of input types, including alphanumeric text, dates, or even structured commands depending on the use case. In some embodiments, the user-entry box may also be equipped with additional features like autocomplete suggestions, input validation, and real-time feedback, which would assist users in constructing accurate and relevant queries. For example, as the user types, the system might suggest commonly used phrases or detect potential errors, offering corrections or alternative options. This enhances the user experience by making interactions more intuitive and reducing the likelihood of mistakes. Furthermore, the interactive element 216a-m could be integrated with the system's event handlers, triggering specific actions or queries once the user submits their input. This input could be processed by the system's backend logic, enabling the generation of appropriate responses, data retrieval, or the initiation of follow-up tasks.

Figure 2B:
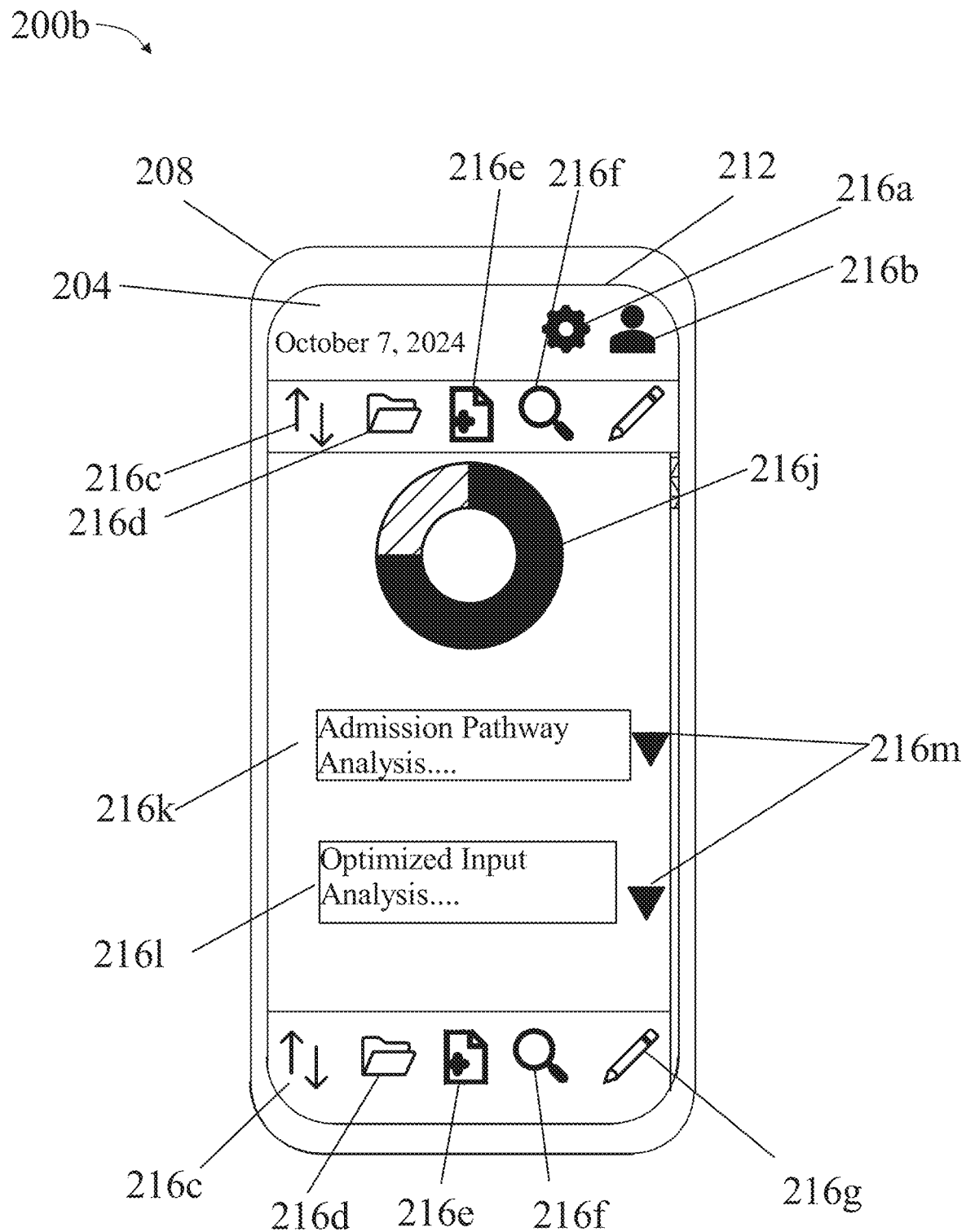
FIG. 2B is an exemplary illustration of a modified graphical user interface.

Now referring to FIG. 2B, an exemplary illustration 200b of a response structure in a graphical user interface. In an embodiment, interactive element 216a-m may include a graphical or diagrammatic representation of the plurality of inputs. In an embodiment, a shaded portion of a diagrammatic representation may represent inputs within the plurality of inputs that are not optimized, whereas a non-shaded portion may represent the inputs within the plurality of inputs that are optimized. The representation could be generated in real-time based on the plurality of inputs and may display various types of data, such as text summaries, charts, tables, or other visual representations of the system's response. The response structure may be interactive, allowing users to engage with the displayed information. For instance, users could click on specific elements within the diagrammatic representation, such as data points on a chart or text segments, to request additional details, perform follow-up actions, adjust optimized versus nonoptimized inputs, and the like. This interactive nature enables the response structure to serve not only as a display for the system's output but also as a hub for further user interaction, driving the flow of information based on evolving plurality of inputs. In some embodiments, the diagrammatic representation may be designed to dynamically update in response to changes in the plurality of inputs or the system's internal state. For example, if the user submits modifies parameters of the plurality of inputs, the diagrammatic representation could be automatically refreshed to reflect the new data. The graphical elements within the structure, such as charts or tables, may be reconfigured to highlight relevant information or present new insights derived from the updated input.

Continuing reference to FIG. 2B, the interactive element 216a-m includes a response structure 216k, serving as the output area where system 100 presents the results of the admission pathway. The response structure 216k displays key decisions, such as admission recommendations, department assignment, and resource needs. Additionally, a dropdown icon 216m allows the user to expand the admission pathway analysis, revealing detailed explanations behind the system's recommendations and ranked inputs. This interactive feature provides users with the ability to explore, adjust, and offer feedback, dynamically updating the results based on new inputs or user modifications. The interactive element 216a-m provides a detailed analysis 216l of the optimized input, showing how it influences the admission pathway. It highlights why this input was ranked highest and its impact on the overall decision. A dropdown icon 216m allows users to expand the analysis, providing more in-depth reasoning and supporting data behind the ranking. This interactive feature gives users the ability to explore the optimized input's role and adjust parameters, offering feedback or modifying the decision-making process as needed.

Figure 3:
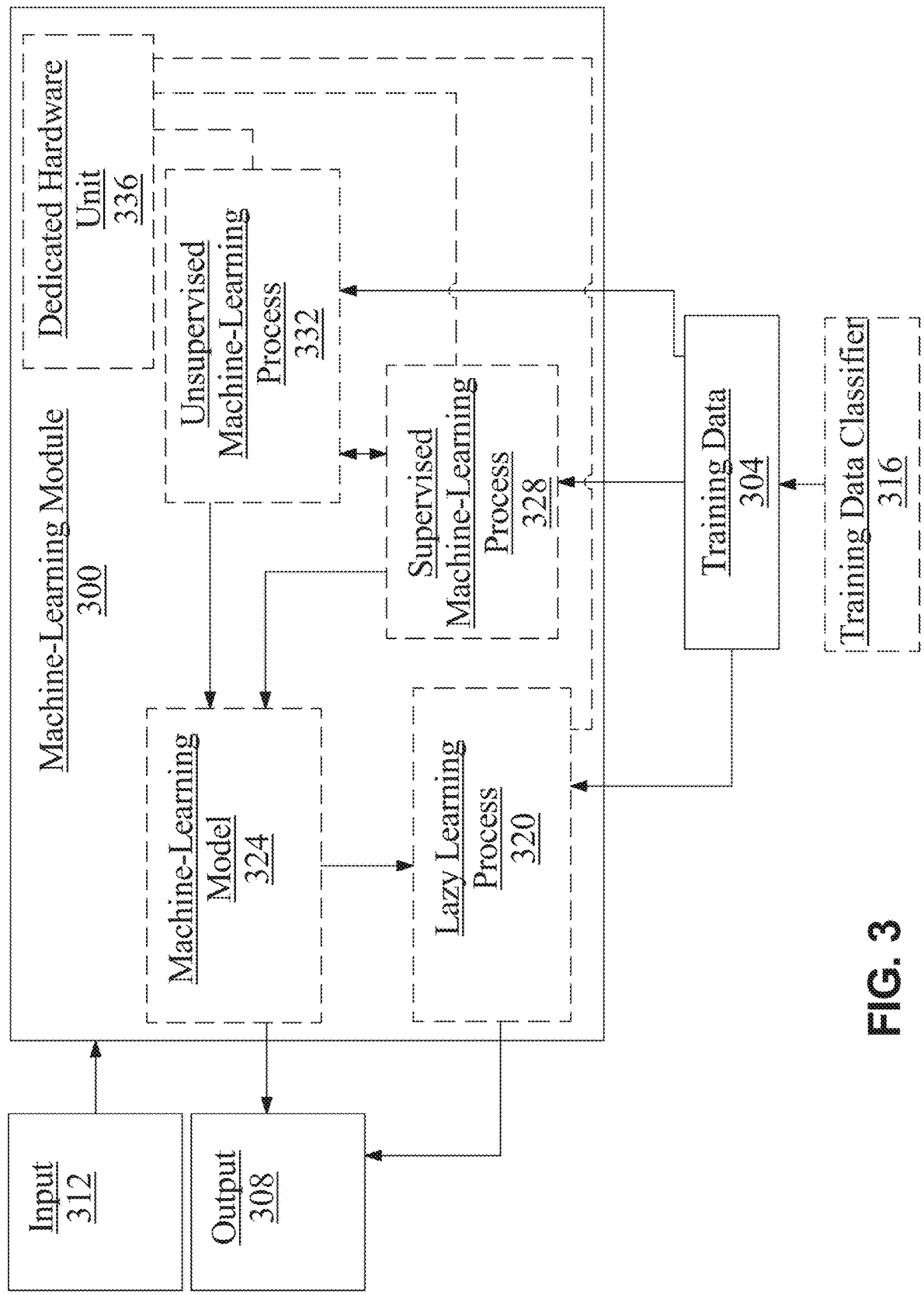
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs such as user input and plurality of command input event handlers and outputs such as optimization datum.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of historical reference data and categories of historical plurality of command input event handlers.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user input and plurality of command input event handlers as described above as inputs, optimization datum as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, system, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, system, and/or method described in this disclosure; such examples may be modified and/or labeled according to user feedback or other processes to indicate desired results, and/or may have actual or measured results from a process being modeled and/or predicted by system, module, machine-learning model or algorithm, system, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, system, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
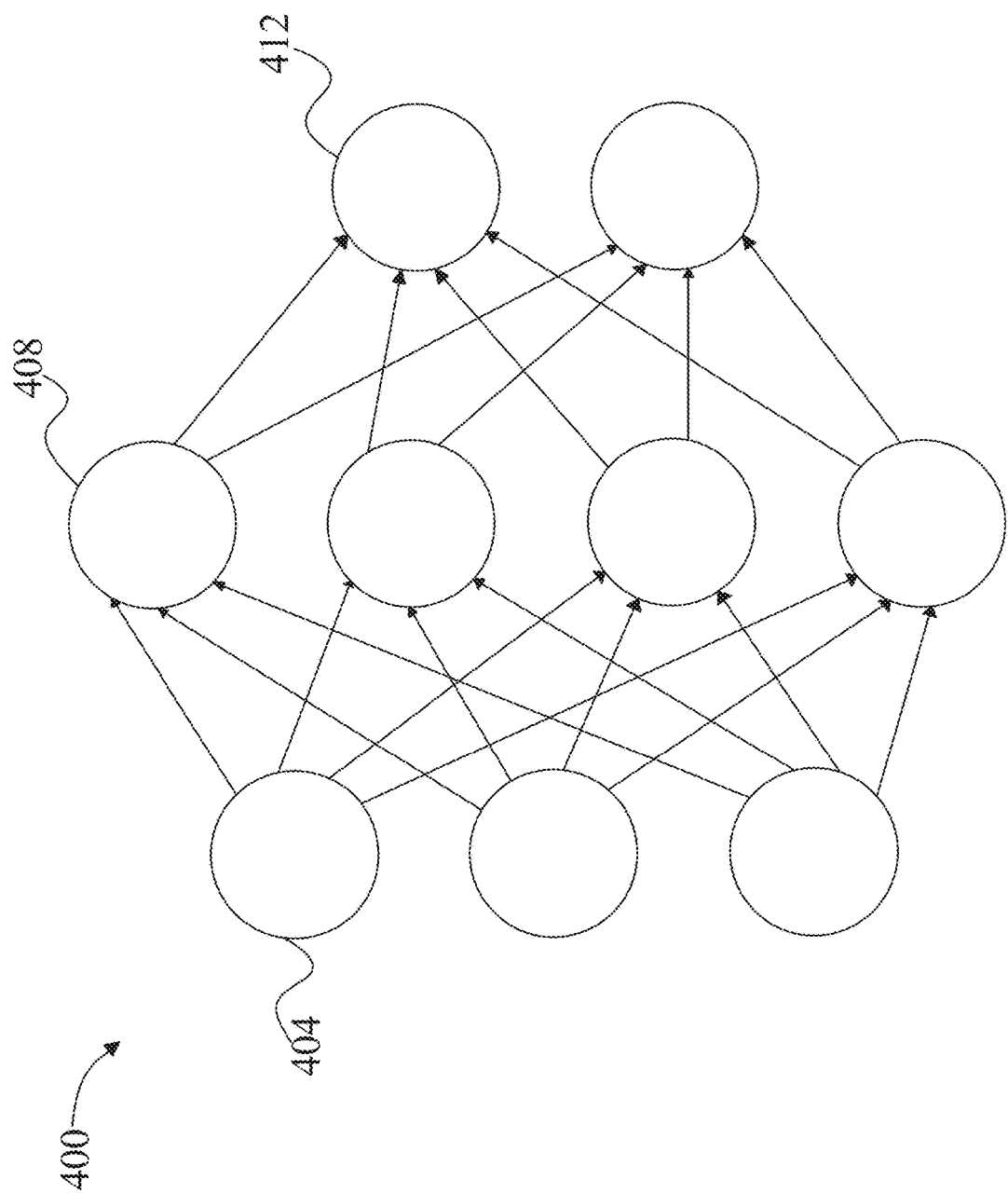
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
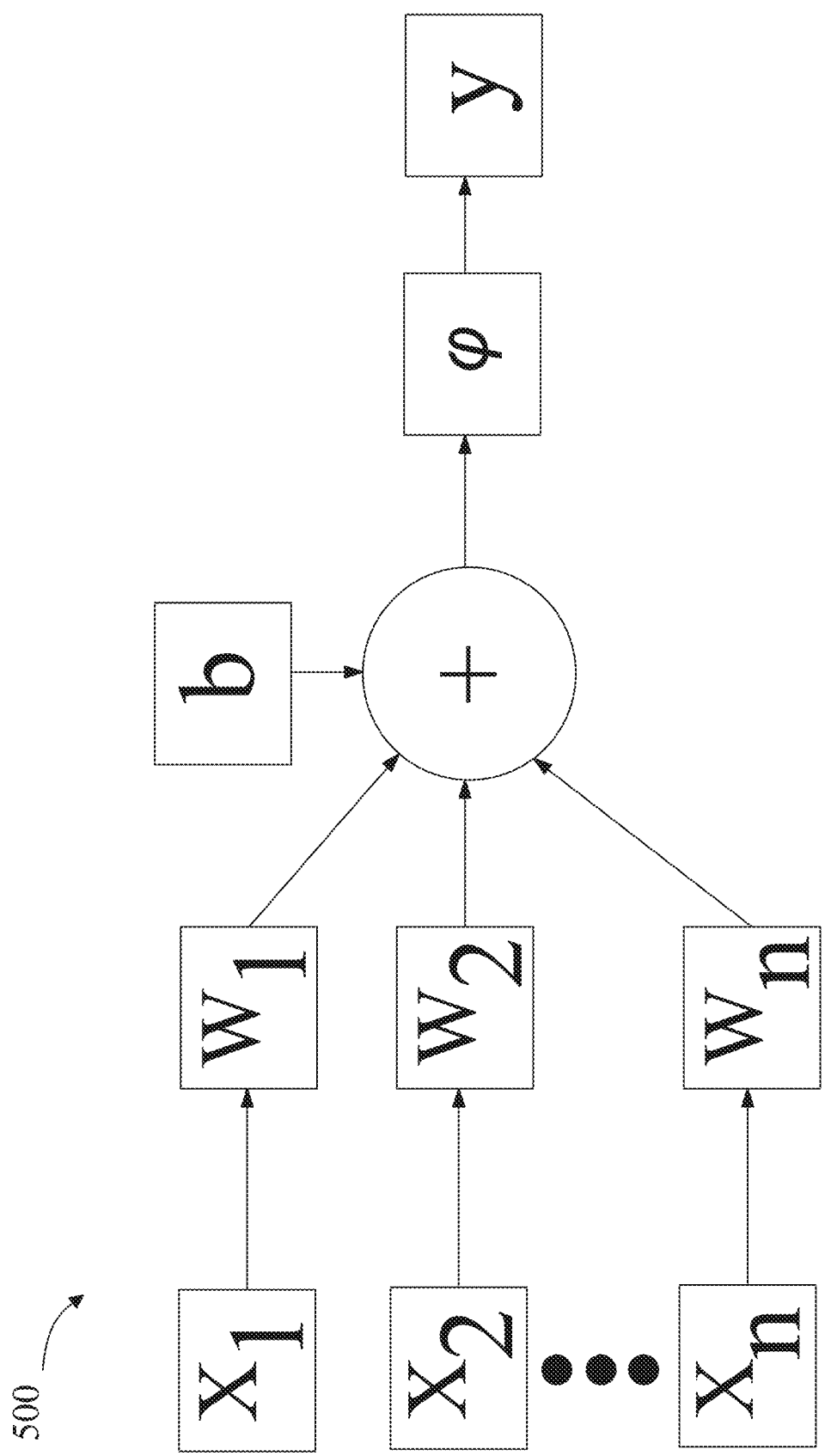
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^x - e^{-x}}{e^x + e^{-x}},$$

a tan h derivative function such as ƒ(x)=tan h²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tan h($\sqrt{2/\pi}$(x+bx^r))) for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
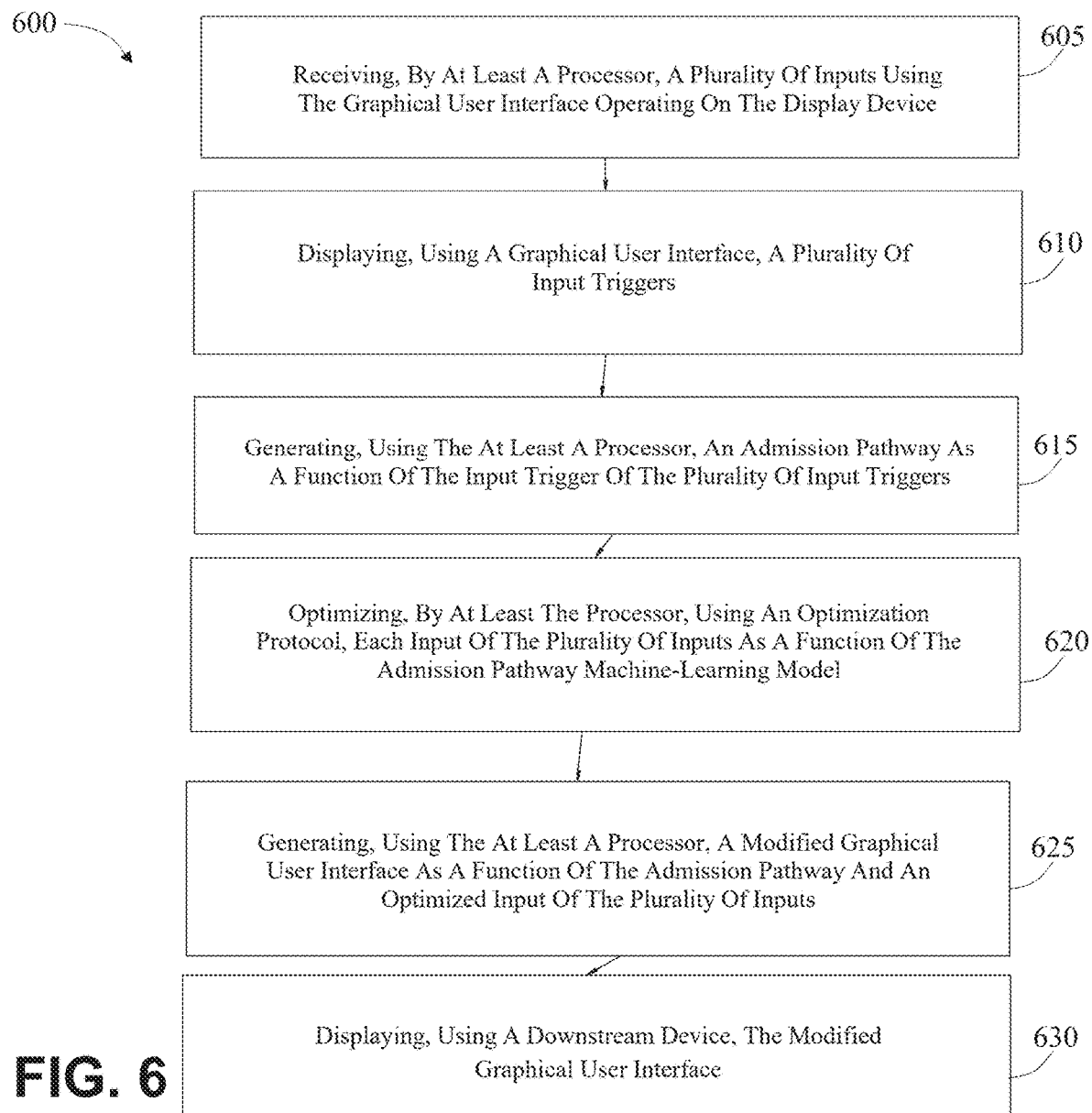
FIG. 6 is block diagram of an exemplary method for generating a modified graphical user interface using an optimization tool.

Now referring to FIG. 6, a flow diagram of an exemplary method 600 for generating a modified graphical user interface using an optimization protocol is illustrated. At step 605, method 600 includes receiving, by at least a processor, a plurality of inputs using the graphical user interface operating on the display device, wherein the plurality of inputs comprises specific-node data. This may be implemented with reference to FIGS. 1-5.

Still referring to FIG. 6, at step 610, method 600 includes displaying, using a graphical user interface, a plurality of input triggers, wherein an input trigger of the plurality of input triggers corresponds to at least a visual element. In an embodiment, the plurality of input triggers comprises baseline data associated with the plurality of inputs. This may be implemented with reference to FIGS. 1-5.

Still referring to FIG. 6, at step 615, method 600 includes generating, using at least a processor, an admission pathway as a function of the input trigger of the plurality of input triggers, wherein generating the admission pathway comprises generating an admission pathway machine-learning model using admission pathway training data configured to correlate each input of the plurality of inputs to an admission pathway output. In an embodiment, the admission pathway machine-learning model is iteratively trained as a function of user feedback related to the accuracy of the admission pathway output. This may be implemented with reference to FIGS. 1-5.

Still referring to FIG. 6, at step 620, method 600 includes optimizing, by at least the processor, each input of the plurality of inputs using an optimization protocol as a function of the admission pathway machine-learning model. In an embodiment, optimizing each input of the plurality of inputs comprises: selectively masking inputs of the plurality of inputs and calculating a divergence value of the admission pathway as a function of the selectively masked input. This may be implemented with reference to FIGS. 1-5.

Still referring to FIG. 6, at step 625, method 600 includes generating, by at least the processor, a modified graphical user interface as a function of the admission pathway and an optimized input of the plurality of inputs. In an embodiment, the modified graphical user interface comprises generating a ranked string of each input of the plurality of inputs based on their importance. This may be implemented with reference to FIGS. 1-5.

Still referring to FIG. 6, at step 630, method 600 includes displaying, using a downstream device, the modified graphical user interface. In an embodiment, displaying the modified graphical user interface includes configuring the display device to present the ranked inputs and the admission pathway in real-time. This may be implemented with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, In a non-limiting embodiment, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. In a non-limiting embodiment, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
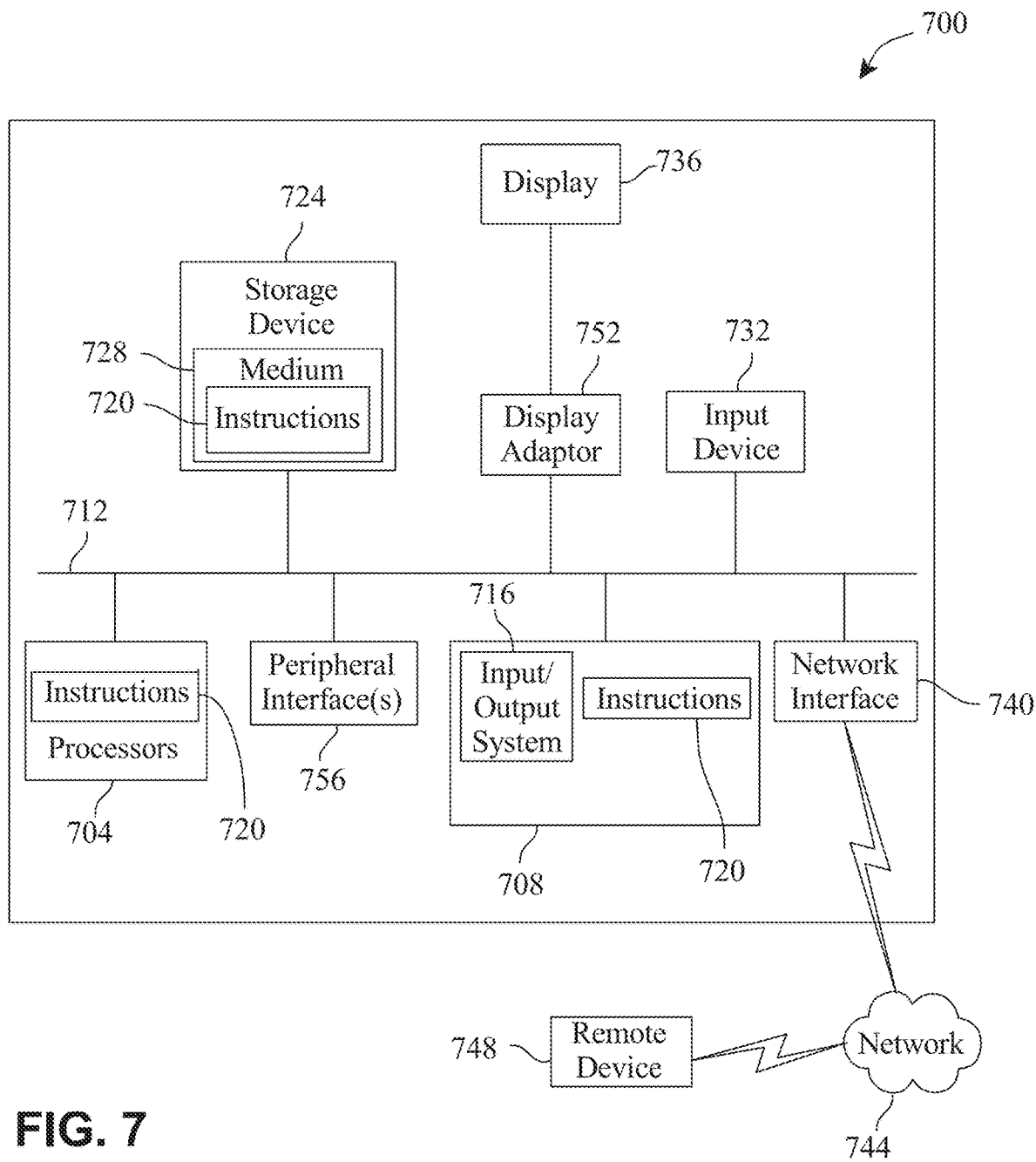
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating a modified graphical user interface using an optimization protocol, wherein the system comprises:
   a display device, wherein the display device displays a graphical user interface;
   at least a computing device, wherein the computing device comprises:
      a memory; and
      at least a processor communicatively connected to the memory, wherein the memory contains instructions configuring the at least a processor to:
         receive a plurality of inputs using the graphical user interface operating on the display device, wherein the plurality of inputs comprises specific-node data;
         display, using the graphical user interface, a plurality of input triggers wherein an input trigger of the plurality of input triggers corresponds to at least a visual element;
         generate an admission pathway as a function of the input trigger of the plurality of input triggers;
         determine, using the at least a processor, an optimization score for each input of the plurality of inputs, wherein the optimization score comprises a quantitative assessment of each input's relevance to generating the admission pathway;
         prioritize, using an optimization protocol, each input of the plurality of inputs as a function of the optimization score;
         generate a modified graphical user interface as a function of the admission pathway and an optimized input of the plurality of inputs; and
         display at least the admission pathway through the modified graphical user interface.

2. The system of claim 1, wherein generating the admission pathway comprises generating the admission pathway as a function of an admission pathway machine-learning model and wherein the admission pathway machine-learning model has been trained using admission pathway training data configured to correlate each input of the plurality of inputs to an admission pathway output.

3. The system of claim 2, wherein the admission pathway machine-learning model has been trained using historical data of a plurality of patient records.

4. The system of claim 1, wherein displaying at least the admission pathway through the modified graphical user interface comprises displaying, using a display device, at least the admission pathway through the modified graphical user interface.

5. The system of claim 1, displaying at least the admission pathway through the modified graphical user interface comprises generating the modified graphical user interface as a function of the admission pathway and an optimized input of the plurality of inputs.

6. The system of claim 5, wherein generating the optimized input comprises selecting at least one input of the plurality of inputs as a function of the optimization score.

7. The system of claim 1, wherein the plurality of inputs comprises a patient medical history.

8. The system of claim 1, wherein the processor is further configured to:
   receive a modification to the optimization score through the modified graphical user interface; and
   dynamically modify the admission pathway as a function of the modification.

9. The system of claim 1, displaying the plurality of input triggers further comprises comparing general-node data received from a database to the specific-node data, wherein the at least a processor is further configured to parse the database for the general-node data comprising at least a characteristic of the specific-node data.

10. The system of claim 1, wherein the visual element comprises an interactive element configured to allow a user to interact with the graphical user interface.

11. A method for generating a modified graphical user interface using an optimization protocol, wherein the method comprises:
   receiving, by at least a processor, a plurality of inputs using a graphical user interface operating on a display device, wherein the plurality of inputs comprises specific-node data;
   displaying, using the graphical user interface, a plurality of input triggers wherein an input trigger of the plurality of input triggers corresponds to at least a visual element;
   generating, using the at least a processor, an admission pathway as a function of the input trigger of the plurality of input triggers;

determining, using the at least a processor, an optimization score for each input of the plurality of inputs, wherein the optimization score comprises a quantitative assessment of each input's relevance to generating the admission pathway;

prioritizing, using an optimization protocol, each input of the plurality of inputs as a function of the optimization score;

generating, using the at least a processor, a modified graphical user interface as a function of the admission pathway and an optimized input of the plurality of inputs; and displaying, by the at least a processor, at least the admission pathway through the modified graphical user interface.

12. The method of claim 11, wherein generating, by the at least a processor, the admission pathway comprises generating the admission pathway as a function of an admission pathway machine-learning model and wherein the admission pathway machine-learning model has been trained using admission pathway training data configured to correlate each input of the plurality of inputs to an admission pathway output.

13. The method of claim 12, wherein the admission pathway machine-learning model has been trained using historical data of a plurality of patient records.

14. The method of claim 11, wherein displaying, by the at least a processor, at least the admission pathway through the modified graphical user interface comprises displaying, using a downstream device, at least the admission pathway through the modified graphical user interface.

15. The method of claim 11, displaying at least the admission pathway through the modified graphical user interface comprises generating the modified graphical user interface as a function of the admission pathway and an optimized input of the plurality of inputs.

16. The method of claim 15, wherein generating the optimized input comprises selecting at least one input of the plurality of inputs as a function of the optimization score.

17. The method of claim 11, wherein the plurality of inputs comprises a patient medical history.

18. The method of claim 11, wherein the processor is further configured to:

receive a modification to the optimization score through the modified graphical user interface; and dynamically modify the admission pathway as a function of the modification.

19. The method of claim 11, wherein:

displaying the plurality of input triggers further comprises comparing general-node data received from a database to the specific-node data; and the method further comprises parsing, by the at least a processor, the database for the general-node data comprising at least a characteristic of the specific-node data.

20. The method of claim 11, wherein the visual element comprises an interactive element configured to allow a user to interact with the graphical user interface.

* * * * *